United States Patent [19]

Itoh et al.

[11] Patent Number: 4,770,942
[45] Date of Patent: Sep. 13, 1988

[54] SILICONE-COATED RELEASE PAPER AND A METHOD FOR THE PREPARATION THEREOF

[75] Inventors: Kunio Itoh; Fumio Okada; Hisashi Aoki; Yasushi Yamamoto, all of Gunma, Japan

[73] Assignee: Shin-Etsu Chemical Co., Ltd., Tokyo, Japan

[21] Appl. No.: 808,866

[22] Filed: Dec. 13, 1985

Related U.S. Application Data

[63] Continuation-in-part of Ser. No. 605,602, Apr. 30, 1984, abandoned.

[30] Foreign Application Priority Data

Jul. 4, 1983 [JP] Japan ................................ 58-121419

[51] Int. Cl.$^4$ .............................................. A23B 4/04
[52] U.S. Cl. .................................. 428/447; 427/54.1; 522/9; 525/478
[58] Field of Search ................... 524/403; 528/31, 15, 528/32; 204/159.13; 428/447; 427/54.1; 525/478; 522/99

[56] References Cited

U.S. PATENT DOCUMENTS

| | | | |
|---|---|---|---|
| 3,814,731 | 6/1974 | Nitzsche et al. | 528/31 |
| 4,025,485 | 5/1977 | Kodama et al. | 528/31 |
| 4,190,688 | 2/1980 | Traver et al. | 525/478 |
| 4,510,094 | 4/1985 | Drahnak | 522/99 |
| 4,530,879 | 7/1985 | Drahnak | 522/99 |
| 4,535,123 | 8/1985 | Sasaki et al. | 524/861 |
| 4,569,980 | 2/1986 | Sasaki et al. | 528/14 |

*Primary Examiner*—Edith Buffalow
*Attorney, Agent, or Firm*—Jules E. Goldberg

[57] ABSTRACT

The invention provides a silicone-coated release paper having a coating surface film of an organopolysiloxane composition curable by irradiation with ultraviolet light or electron beams to give a fully cured film resistant to migration of the organopolysiloxane constituents therefrom on to other surfaces in contact therewith. The composition comprises (a) a diorganopolysiloxane terminatd at both molecular chain ends each with a divinylmethylsilyl group or trivinylsilyl group, (b) an organohydrogenpolysiloxane having at least 2 hydrogen atoms directly bonded to the silicon atoms in a molecule, (c) a catalytic amount of a platinum or rhodium catalyst and, optionally, (d) a compound of a rare earth element such as ceric oxide.

7 Claims, No Drawings

SILICONE-COATED RELEASE PAPER AND A METHOD FOR THE PREPARATION THEREOF

BACKGROUND OF THE INVENTION

This is a continuation-in-part application from a copending U.S. patent application Ser. No. 605,602 filed Apr. 30, 1984 now abandoned.

The present invention relates to a silicone-coated release paper or, generally, a release sheet and a method for the preparation thereof or, more particularly, to a release paper and other sheet-like substrate materials coated with a radiation-curable organopolysiloxane or silicone composition which provides a coating layer on a substrate surface fully cured by the irradiation of a relatively small dose with actinic rays to such an extent as to be freed from the problem of surface migration of the silicone.

Conventionally, several types of organopolysiloxane compositions are known as a surface-releasing coating material on release papers which are curable by irradiation with actinic rays. They include, for example, the compositions curable by the mechanism of the addition reaction induced by the irradiation with light between an organopolysiloxane having vinyl groups bonded to the silicon atoms and an organohydrogenpolysiloxane having hydrogen atoms directly bonded to the silicon atoms disclosed in Japanese Patent Kokai Nos. 47-32072 and 53-48198 and the compositions curable by the reaction in the presence of a photosensitizer between an organopolysiloxane having mercapto-substituted hydrocarbon groups bonded to the silicon atoms and an organopolysiloxane having vinyl groups bonded to the silicon atoms disclosed in Japanese Patent Publications Nos. 54-6523 and 57-34318 and Japanese Patent Kokai 54-48854 and 54-50067.

These compositions are, however, not quite satisfactory in properties when they are used in some applications such as the use in release papers because curing of the silicone composition on the surface is sometimes incomplete to cause migration of the silicone toward a body in contact with the silicone-coated surface. That is, there are several disadvantages such as a change of the releasability on the surface in the lapse of time and the migration of the silicone to the layer of the pressure-sensitive adhesive in contact therewith owing to the incomplete cure by the irradiation with light when the composition is used as a very thin coating film applied to the surface of a paper as the substrate of release papers.

Therefore, there have been several proposals with an object to overcome these deficiencies by the improvement of the curability including increase of the content of the functional groups in the siloxanes and increase of the amount of the photosensitizer compound, but these measures are not practicable because of some accompanying disadvantages including the undesirable deterioration of the releasability and emission of an unpleasant odor to greatly decrease the practicability of the methods.

SUMMARY OF THE INVENTION

An object of the present invention is therefore to provide a release paper coated with a radiation-curable composition comprising an organopolysiloxane free from the above described disadvantages in the prior art release papers coated, in particular, with a radiation-curable silicone composition.

Thus, the silicone-coated release paper of the invention comprises:

(A) a substrate in the form of a sheet; and (B) a surface film formed on the substrate by the irradiation with actinic rays of a layer of an organopolysiloxane composition comprising (a) a diorganopolysiloxane having a linear molecular structure represented by the structural formula

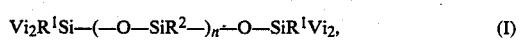

$$Vi_2R^1Si-(-O-SiR^2-)_n-O-SiR^1Vi_2, \quad (I)$$

in which Vi is a vinyl group, $R^1$ is a vinyl group or $R^2$, $R^2$ is a halogen-substituted or unsubstituted monovalent hydrocarbon group having 1 to 30 carbon atoms and n is a positive integer, (b) an organohydrogenpolysiloxane having at least two hydrogen atoms each directly bonded to the silicon atom in a molecule in an amount sufficient to provide from 0.01 to 100 moles of the silicon-bonded hydrogen atoms per mole of the unsaturated groups in the component (a);

(c) a catalytic amount of platinum, rhodium or a compound thereof; and (d) optionally, a catalytic amount of a compound of a rare earth element.

It is particularly preferable that the group denoted by $R^1$ in the general formula (I) for the above described diorganopolysiloxane as the component (a) is a vinyl group so that the diorganopolysiloxane has a linear molecular structure terminated at both molecular chain ends each with a trivinylsilyl group as represented by the general formula

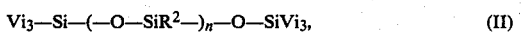

$$Vi_3-Si-(-O-SiR^2-)_n-O-SiVi_3, \quad (II)$$

in which Vi is a vinyl group, $R^2$ has the same meaning as defined above and n is a positive integer.

The above described organopolysiloxane composition can be cured efficiently by the irradiation of a thin coating layer thereof on a substrate surface with actinic rays or ionizing radiations to form a cure thin surface film acting as a releasing layer on the surface of various substrate materials.

DETAILED DESCRIPTION OF THE PREFERRED EMBODIMENTS

The inventors of the present invention have continued extensive studies on organopolysiloxane compositions curable by irradiation with actinic radiations such as ultraviolet light, high-energy electron beams and the like to arrive at the establishment of the present invention after confirmation that an organopolysiloxane composition capable of giving a fully cured film by irradiation with ultraviolet light in an extremely short time such as 0.5 second or less or with electron beams in a very small radiation dose of, for example, 5 Mrad or less can be formulated by compounding an organopolysiloxanes containing at least two unsaturated groups each bonded to the silicon atom in a molecule or, preferably, a diorganopolysiloxane of which each of the terminal silicon atoms has two or three vinyl groups directly bonded thereto and an organohydrogenpolysiloxane having at least two hydrogen atoms each directly bonded to the silicon atom in a molecule with admixture of a catalyst for the addition reaction which is platinum, rhodium or a compound thereof and the cured film formed from the composition by the irradiation with actinic rays is outstandingly tack-free and firmly adheres to various substrate surfaces on which it has been cured including paper, plastics and some metals irrespective of the types of the composition which may be a non-solvent type, a solution type or an aqueous emulsion type. The present invention has been accomplished also on the base of the confirmation that the disadvantageous delay in curing can be obviated by the addition of a compound of a rare earth element even when the diorganopolysiloxane with unsaturation as the component (a) and/or the organohydrogenpolysiloxane as the component (b) have a relatively small degree of polymerization adversely affecting the velocity of curing by the irradiation with actinic rays while it is known that the curing velocity is higher with these organopolysiloxane components having higher degrees of polymerization. Further, the present invention has been completed on the base of the elaborate experimentation for the requisite conditions of these organopolysiloxanes and the like, the kind and amount of the catalyst and the compounds of rare earth metals to be optionally admixed in the composition.

The diorganopolysiloxane as the component (a) in the composition to be applied to the substrate surface for the release paper of the present invention has a linear molecular structure represented by the general formula (I) given above in which each of the symbols has the meaning defined before. Exemplary of the group denoted by $R^2$ in the above given general formula (I) are halogen-substituted or unsubstituted monovalent hydrocarbon groups such as alkyl groups, e.g. methyl, ethyl and propyl groups, cycloalkyl groups, e.g. cyclohexyl group, alkenyl groups, e.g. vinyl group, aryl groups, e.g. phenyl and tolyl groups, and halogenated hydrocarbon groups obtained by the substitution of one or more of halogen, e.g. chlorine and bromine, atoms for part or all of the hydrogen atoms in the above named hydrocarbon groups such as chloromethyl, chloropropyl, chlorophenyl, bromopropyl, 3,3,3-tri-fluoropropyl and $\alpha,\alpha,\alpha$-trifluorotolyl groups each having 1 to 30 or, preferably, 1 to 19 carbon atoms. The groups denoted by $R^2$ in a molecule may be either the same ones or different from each other. Accordingly, the diorganopolysiloxane is usually composed of either a single kind or a combination of the units of dimethylsiloxane, methylvinylsiloxane, diphenylsiloxane, methylphenylsiloxane and the like excepting the terminal groups. Mostly, the group denoted by $R^2$ is preferably a methyl group so that the diorganopolysiloxane as the component (a) is a dimethylpolysiloxane terminated at both molecular chain ends each with a divinylmethylsiloxy group or, preferably, trivinylsiloxy group although replacement of a part of the methyl groups with vinyl groups may be preferred in view of the good curability of the composition and good surface releasability of the inventive release paper.

As is mentioned before, a particularly prferable species of the diorganopolysiloxane as the component (a) is a dimethylpolysiloxane having a linear molecular structure and terminated at both molecular chain ends each with a divinylmethylsilyl or trivinylsilyl group so that the diorganopolysiloxane is represented by the formula

  (III)

or

  (IV)

in which Vi is a vinyl group, Me is a methyl group and n is a positive integer.

Also, the organohydrogenpolysiloxane as the component (b) may be either a homopolymer or a copolymer containing other kinds of siloxane units such as a copolymer composed of dimethylsiloxane units and methylhydrogensiloxane units and the molecular configuration thereof is not particularly limitative including linear, three-dimensionally crosslinked and cyclic ones provided that they contain at least two silicon-bonded hydrogen atoms in a molecule. The amount of the component (b) should be sufficient to give the silicon-bonded hydrogen atoms in a molar ratio from 100:1 to 1:100 or, preferably, from 1:2 to 2:1 to the unsaturated groups or vinyl groups contained in the aforementioned component (a).

On the other hand, platinum, rhodium and a compound thereof as the component (c) in the present composition serve as the curing catalyst for the composition composed of the above-mentioned components (a) and (b) and they are added to the composition in an amount of 0.5 ppm or larger or, preferably, in the range of 1 to 500 ppm by weight based on the total amount of the components (a) and (b). Examples of the component (c) are elementary platinum and rhodium as well as compounds of these noble metals supported on a carrier such as charcoal, alumina and the like, soluble compounds of platinum or rhodium such as platinum chloride, chloroplatinic acid and the like and, in addition, complexes prepared by the reaction of these soluble compounds of platinum or rhodium with an unsaturated compound such as cyclohexene, ethylene and the like.

The organopolysiloxane composition of the present invention can be prepared by mixing the above described components (a), (b) and (c) in a proportion within the above indicated ranges, but may further be admixed with a compound of a rare earth element as the component (d) according to need. The rare earth compound is selected from the compounds of any element of the lanthanides and yttrium or, preferably, the element of the so-called light rare earths such as lanthanum, cerium, neodymium, samarium and the like. The compound may be in a chemical form of an oxide, hydroxide, basic carbonate and the like. Furthermore, oxides and hydroxides containing chemical bonds between silicon atoms and the atoms of the rare earth element as represented by the formula Si-O-M in which M is an atom of the rare earth element, and compounds obtained by the cohydrolysis of one or more of hydrolyzable silanes represented by the general formula $R^4_d SiX_{4-d}$, in which $R^4$ is a monovalent hydrocarbon group, X is a hydrolyzable group and d is 0 or an integer from 1 to 3, or a partial hydrolyzate thereof and a compound of a rare earth element such as $CeX_3$, in which X has the same meaning as above. The admixed component (d) shows an effect of accelerating the curing reaction in the case where the above-described components (a) and (b) in the composition have a relatively low degree of polymerization of, for example, several hundreds or smaller and the composition is oily. This is a quite new discovery obtained by the inventors and different from the known effect obtained by the addition of a fatty acid salt of a rare earth element used conventionally as an improver agent for the thermal resistance of organopolysiloxanes.

In order to obtain a full exhibition of the above-described effect, the component (d) is preferably added in the form of a finely divided powder having a particle size distribution as fine as possible and a specific surface area as large as possible. Also, the component (d) should preferably have active groups such as hydroxyl groups on the particle surface. It should be noted that prolonged heat treatment of the rare earth compound at an elevated temperature of, for example, 500° C. or higher should be avoided because of the possible loss of the surface activity leading to the absence of the desired effect. The amount of the component (d) added in the inventive composition is preferably in the range from 0.1 to 30 parts by weight or, more preferably, in the range from 0.5 to 5 parts by weight per 100 parts by weight of the total amount of the components (a) and (b).

The organopolysiloxane composition used in the preparation of the release paper of the present invention comprising the above-mentioned components (a), (b), (c) and, optionally, (d) may also contain according to need any kind of conventional additives including pot-life extenders and antioxidants, diorganopolysiloxanes without unsaturation, fillers such as silica and the like, thermal resistance improvers, colorants and other additives. The viscosity of the composition is not critical and may be in the range from 50 to 1,000,000 centistokes as measured at 25° C. Although it is optional that the organopolysiloxane composition used in the invention, when it has an excessively high viscosity, may be dispersed in or diluted with a suitable organic solvent to facilitate handling, the viscosity of the composition should preferably be in the range from 500 to 20,000 centipoise in consideration of the workability in the application of the composition when the use of an organic solvent is undesirable. The type of the solvent used to dissolve or dilute the composition is not particularly limitative provided that it is inert to the components therein including aliphatic hydrocarbons, aromatic hydrocarbons, chlorinated hydrocarbons, esters, ethers, ketones and the like exemplified by hexane, heptane, mineral spirit, toluene, xylene, trichloroethylene, tetrahydrofuran and the like.

The composition used in the preparation of the release paper of the present invention is of course usable in other applications in the form of either a varnish composition or a rubber composition according to the kinds of the organopolysiloxanes as the major components and has a wide scope of uses including potting agents for electronic devices and instruments, coating materials on various substrates such as plastics and the like, coating materials on glass sleeves and optical fibers, impregnants for electrical insulation, water repellent agents, paint additives and the like since the composition applied to the surface of any object body can be converted into a fully cured film when irradiated with ultraviolet light for a short time of 0.5 second or less using a conventionally available ultraviolet lamp or with electron beams at an outstandingly low radiation dose of 5 Mrads or less.

As is mentioned in the above, the organopolysiloxane composition for the preparation of the inventive release paper is applied to the surface of a substrate in a coating amount, for example, in the range from 0.1 to 5 g/m$^2$ and can be cured by irradiation with actinic rays. Suitable radiation sources are ultraviolet light and electron beams although the types of the actinic rays are not limited thereto. Ultraviolet irradiation is preferred. Several of the examples of the ultraviolet source are xenon lamps, mercury lamps of low, medium and high pressure types and the like, and the examples of the electron beam source are electron beam accelerators of various types including the Van-de-Graaff type, the resonant transformer type, the linear accelerator type, the Dynamitron (manufactured by Radiation Dynamics, Inc., U.S.A., a tradename) type, the high-frequency type and the like, and the electron beams emitted from these electron accelerators are suitably used when they have an energy in the range from 50 to 1,000 KeV or, preferably, from 100 to 300 KeV. The irradiation with electron beams can be performed by scanning electron beams in spot at a high frequency or with a curtain-like shower of electron beams on the material under irradiation. A radiation dose in the range from 0.1 to 10 Mrads is sufficient to fully cure the organopolysiloxan composition.

Following are the examples to illustrate the present invention in more detail in which the expression of "parts" always refers to "parts by weight" and the viscosity data are the values obtained by the measurements at 25° C. In the following Examples, curing of the organopolysiloxane composition applied to the substrate surface was performed either with ultraviolet light or with electron beams in the following manner.

(1) Ultraviolet irradiation

Using two high pressure mercury lamps each having an output of 2 kilowatts or a linear output density of 80 watts/cm, the polyethylene-laminated paper coated with the organopolysiloxane composition was irradiated for a specified length of time with the light from these mercury lamps at a distance of 8 cm to effect curing of the organopolysiloxane composition.

(2) Electron beam irradiation

The polyethylene-laminated paper coated with the organopolysiloxane composition was irradiated with electron beams from a low-energy electron accelerator (manufactured by Energy Science Co., U.S.A.) to effect curing of the organopolysiloxane composition.

The silicone release papers having a cured layer of the organopoilysiloxane composition prepared in the above described manner were evaluated for the curability of the composition, peeling resistance, migration of silicone and subsequent adhesion in the manner described below.

Curability of the composition: the organopolysiloxane composition was applied to a polyethylene-laminated paper in a coating amount in the range from 0.8 to 1.0 g/m$^2$ and the minimum irradiation times and the radiation doses necessary to effect full curing of the composition were determined in the curing treatments by irradiation with ultraviolet light or electron beams. The conditions of the ultraviolet or electron beam irradiation were the same as described above but the irradiation time was 0.1, 0.3, 0.4, 0.6 or 1.2 seconds in the ultraviolet irradiation and the radiation dose was 2 or 5 Mrads in the electron beam irradiation to examine the condition of cure of the organopolysiloxane composition for each of the irradiation times or doses.

Peeling resistance: a pressure-sensitive adhesive (Orivain BPS-5127, a product by Toyo Ink Manufacturing Co., Ltd.) was applied to the surface of the cured film of the organopolysiloxane composition on the polyethylene-laminated paper followed by heating for 3 minutes at 100° C. and a laminating paper was applied to the surface of the thus dried pressure-sensitive adhesive, which was, after standing for 3 hours at 25° C., peeled by pulling at a direction of 180° angle using a tensile testing machine to record the force in g required for peeling of the paper.

Subsequent adhesion: a polyester tape (Nitto Polyester Tape 31B manufactured by Nitto Denko Co., Ltd., Japan) was applied to the cured film of the organopolysiloxane composition on the polyethylene-laminated paper and a weight to give a load of 20 g/cm$^2$ was put on it. After standing for 20 hours at 70° C., the tape was peeled off and again applied to a stainless steel plate followed by peeling therefrom to determine the force in g required for peeling of the tape. This value was given in terms of the ratio in % to the value obtained in a similar manner but with a fresh standard tape.

Migration of silicone: a polyester film having a thickness of 20 μm was laminated to the surface of the cured film of the organopolysiloxane composition on the polyethylenelaminated paper and kept standing under a load of 20 g/cm$^2$ at 70° C. for 20 hours. The polyester film was peeled off from the surface of the silicone layer and lines were drawn thereon with an organic solution-type marking ink by use of a felt pen to visually examine the repellency of the surface to the marking ink when the surface of the tape was contaminated with the silicone migrated thereto from the cured layer of the organopolysiloxane composition on the polyethylene-laminated paper. The degree of silicone migration was visually evaluated in 4 ratings of A, B, C and D according to the following criteria.

A: No migration was noted at all.
B: Migration was noted to some extent.
C: Little repellency to the marking ink was noted but migration was noticeable.
D: Repellency to the marking ink was clearly noted to indicate migration of silicone.

EXAMPLE 1

Seven organopolysiloxane-based coating compositions were prepared each by uniformly blending 100 parts of either one of the vinyl-containing diorganopolysiloxanes I, II, III, IV and V indicated below as the base polysiloxane, i.e. component (a), a methylhydrogenpolysiloxane having a viscosity of 30 centistokes at 25° C. and terminated at both molecular chain ends each with a trimethylsilyl group in an amount indicated in Table 1 below and a platinum-vinylsiloxane complex in an amount to give 150 ppm of platinum based on the overall amount of the polysiloxanes.

Vinyl-containing diorganopolysiloxanes

I: a methylvinylpolysiloxane having a viscosity of 1000 centistokes and terminated at both molecular chain ends each with a vinyl dimethylsilyl group, the diorganosiloxane units being all dimethylsiloxane units
II: a methylvinylpolysiloxane having a viscosity of 1000 centistokes and terminated at both molecular chain ends each with a trivinylsilyl group, the diorganosiloxane units being all dimethylsiloxane units
III: a methylvinylpolysiloxane having a viscosity of 1000 centistokes and terminated at both molecular chain ends each with a divinylmethylsilyl group, the diorganosiloxane units being all dimethylsiloxane units
IV: a methylvinylpolysiloxane having a viscosity of 100 centistokes and terminated at both molecular chain ends each with a vinyldimethylsilyl group, the diorganosiloxane units being all dimethylsiloxane units
V: a methylvinylpolysiloxane having a viscosity of 1000 centistokes and terminated at both molecular chain ends each with a vinyldimethylsilyl group, the diorganosiloxane units being composed of 98.5 % by moles of dimethylsiloxane units and 1.5 % by moles of vinylmethylsiloxane units Each of the coating compositions prepared in the above described manner was applied to a polyethylene-laminated paper in a coating amount of 0.8 to 1.0 g/m$^2$ and the coated paper was subjected to ultraviolet irradiation in the above described manner for a length of time indicated in Table 1 below which was sufficient to the disappearance of tackiness on the surface. The thus silicone-coated paper was subjected to the tests of the peeling resistance and migration of silicone as a release paper in the above described manner to give the results shown in Table 1.

TABLE 1

| Composition No. | Base polysiloxane | Methylhydrogen polysiloxane, parts (SiVi/SiH*) | Seconds for UV irradiation | Peeling resistance, g/5 cm | Migration of silicone |
| --- | --- | --- | --- | --- | --- |
| 1 | I | 1.3 (2.0) | 10 | 89 | D |
| 2 | III | 1.3 (1.0) | 1.2 | 38 | C |
| 3 | II | 3.9 (2.0) | 0.6 | 105 | A |
| 4 | III | 2.6 (2.0) | 1.2 | 97 | B |
| 5 | IV | 3.9 (2.0) | 4.8 | 155 | C |
| 6 | V | 3.9 (2.0) | 2.4 | 169 | C |

*Molar ratio of vinyl groups in the base polysiloxane to the silicon-bonded hydrogen atoms in the methylhydrogenpolysiloxane The release papers prepared above by use of the coating compositions No. 3 to No. 6 were kept standing for 24 hours at room temperature with the coated surface upside and the peeling resistance of each release papers was again determined to find that the peeling resistance had increased more or less to 116, 250, 790 and 940 g/5 cm for the coating compositions No. 3, No. 4, No. 5 and No. 6, respectively. This result clearly indicates the outstanding stability of the release paper prepared with the coating composition No. 3 formulated with the trivinylsilyl-terminated diorganopolysiloxane as the base.

The coating compositions 3 to 6 were further subjected to the test for the influence of the coating amount on the polyethylene-laminated paper in the range from 0.1 to 2.0 g/cm$^2$ on the minimum length of time in seconds for tack-free curing by the ultraviolet irradiation in the same manner as above to give the results in seconds shown in Table 2 below. As is clear from the results in this table, the coating composition No. 3 formulated with the trivinylsilyl-terminated diorganopolysiloxane as the base had a remarkably high curing velocity in comparison with the other coating compositions regardless of the coating amount.

TABLE 2

| Composition No. | Coating amount, g/m$^2$ | | | |
| --- | --- | --- | --- | --- |
| | 2.0 | 1.0 | 0.3 | 0.1 |
| 3 | 0.6 | 0.6 | 0.6 | 0.6 |
| 4 | 1.2 | 1.2 | 1.2 | 1.2 |
| 5 | 4.8 | 4.8 | 10 | 10 |
| 6 | 2.4 | 2.4 | 4.8 | 10 |

EXAMPLE 2

Two organopolysiloxane compositions were prepared each by mixing 100 parts of a methylvinylpolysiloxane having a viscosity of 1000 centistokes and composed of 3 % b moles of vinylmethylsiloxane units and 97 % by moles of dimethylsiloxane units with vinyldimethylsilyl groups at the molecular chain ends (referred to as the $Vi_1$-blocked siloxane hereinbelow) or a methylvinylpolysiloxane having a viscosity of 1,000 centistokes and composed of 1 % by moles of vinylmethylsiloxane units and 99 % by moles of dimethylsiloxane units with trivinylsilyl groups at the molecular chain ends (referred to as the $Vi_3$-blocked siloxane hereinbelow) as the component (a), 5 parts of a methylhydrogenpolysiloxane having a viscosity of 30 centistokes blocked with trimethylsilyl groups at the molecular chain ends and a platinum-vinylsiloxane complex in an amount of 150 ppm as platinum metal based on the total amount of the polysiloxanes.

Each of the above prepared organopolysiloxane compositions was further admixed with 3 parts of powdery ceric oxide having an average particle diameter of 0.2 μm and comparison was made of the curability of these compositions without and with admixture of the ceric oxide to give the results shown in Table 3 below. The procedure for the test of the curability was described before.

TABLE 3

| Curing with | Type of component (a) | Ceric oxide added | Minimum condition for curing | Peeling resistance, g/5 cm | Subsequent adhesion, % | Migration of silicone |
|---|---|---|---|---|---|---|
| Ultraviolet light | $Vi_1$-blocked | Yes | 0.6 second | 140 | 94 | B |
| | | No | 1.2 seconds | 171 | 85 | C |
| | $Vi_3$-blocked | Yes | 0.4 second | 171 | 98 | A |
| | | No | 0.6 second | 165 | 93 | B-A |
| Electron beams | $Vi_1$-blocked | Yes | 2 Mrads | 111 | 95 | B |
| | | No | 5 Mrads | 125 | 87 | B |
| | $Vi_3$-blocked | Yes | 2 Mrads | 157 | 96 | A |
| | | No | 5 Mrads | 150 | 94 | B-A |

What is claimed is:

1. A silicone-coated release paper which comprises:
   (A) a substrate in the form of a sheet; and
   (B) a surface film formed on the substrate by the irradiation with actinic rays of a layer of an organopolysiloxane composition comprising
      (a) a diorganopolysiloxane having a linear molecular structure represented by the structural formula $$Vi_2R^1Si\text{—}(\text{—}O\text{—}SiR^2\text{—})_n\text{—}O\text{—}SiR^1Vi_2,$$

in which Vi is a vinyl group, $R^1$ is a vinyl group or $R^2$, $R^2$ is a halogen-substituted or unsubstituted monovalent hydrocarbon group having 1 to 30 carbon atoms and n is a positive integer,
      (b) an organohydrogenpolysiloxane having at least two hydrogen atoms each directly bonded to the silicon atom in a molecule in an amount sufficient to provide from 0.01 to 100 moles of the silicon-bonded hydrogen atoms per mole of the unsaturated groups in the component (a); and
      (c) a catalytic amount of platinum, rhodium or a compound thereof.

2. The silicone-coated release paper as claimed in claim 1 wherein the group denoted by $R^1$ is a vinyl group.

3. The silicone-coated release paper as claimed in claim 1 wherein the group denoted by $R^2$ is a methyl group or a vinyl group.

4. A method for the preparation of a silicone-coated release paper which comprises the steps of:
   (i) coating at least one surface of a substrate in a sheet-like
      (a) a diorganopolysiloxane having a linear molecular structure represented by the structural formula $$Vi_2R^1Si\text{—}(\text{—}O\text{—}SiR^2\text{—})_n\text{—}O\text{—}SiR^1Vi_2$$

in which Vi is a vinyl group, $R^1$ is a vinyl group or $R^2$, $R^2$ is a halogen-substituted or unsubstituted monovalent hydrocarbon group having 1 to 30 carbon atoms and n is a postive integer,
      (b) an organohydrogenpolysiloxane having at least two hydrogen atoms each directly bonded to the silicon atom in a molecule in an amount sufficient to provide from 0.01 to 100 moles of the silicon-bonded hydrogen atoms per mole of the unsaturated groups in the component (a); and
      (c) a catalytic amount of platinum, rhodium or a compound thereof,
   in a coating amount in the range from 0.1 to 5.0 g/m²; and
   (ii) irradiating the thus formed coating layer with an actinic radiation to cure the organopolysiloxane composition.

5. The method for the preparation of a silicone-coated release paper as claimed in claim 4 wherein the group denoted by $R^1$ is a vinyl group.

6. The method for the preparation of a silicone-coated release paper as claimed in claim 4 wherein the group denoted by $R^2$ is a methyl group or a vinyl group.

7. The method for the preparation of a silicone-coated release paper as claimed in claim 4 wherein the actinic radiation is ultraviolet light.

* * * * *